Patented Oct. 12, 1943

2,331,622

UNITED STATES PATENT OFFICE 2,331,622

METHOD FOR RECONDITIONING USED SOLUTIZER SOLUTIONS

Alan C. Nixon, San Francisco, and Orris L. Davis, Oakland, Calif., assignors to Shell Development Company, San Francisco, Calif., a corporation of Delaware No Drawing. Application October 21, 1941, Serial No. 415,904

5 Claims. (Cl. 252—192)

This invention relates to the art of refining hydrocarbons by extraction with so-called solutizer solutions, and more particularly to a method for reconditioning used solutizer solution. Specifically it is concerned with a method for treating a contaminated aqueous solutizer solution with solid adsorbents at elevated temperatures, whereby gums, resinous emulsifiers and foaming agents are removed. In addition, it comprises certain novel methods for separating the last remaining traces of adsorbent from cleansed solutizer solutions.

The solutizer process by means of which mercaptans and other weak organic acids contained in sour hydrocarbon distillates, and more particularly in gasoline distillates, are extracted with solutizer solution, i. e., aqueous solutions of alkali metal hydroxides containing solutizers, is well known. The solutizer process has been described, and the several compounds particularly suitable as solutizers have been enumerated in a series of patents and patent applications, as well as in the general literature, for example, in the Yabroff et al. U. S. Patents 2,149,379; 2,-149,380; 2,152,166; 2,152,720; 2,152,723; 2,164,851; 2,186,398; 2,202,039; 2,223,798; 2,229,995; Refiner and Natural Gasoline Manufacturer, May, 1939, pages 171 to 176, and March, 1940, pages 73 to 76; Industrial and Engineering Chemistry, vol. 32, pages 257 to 262 (February, 1940); Chemical and Metallurgical Engineering, vol. 47, pages 776 to 778 (November, 1940); Oil and Gas Journal, vol. 39, No. 26, pages 35 to 46 (November 7, 1940), etc.

The more desirable substances capable of acting as solutizers being relatively expensive, it usually becomes necessary that the solution be regenerated and used over and over to obtain the maximum operating economy.

In the ordinary course of treatment in a solutizer plant, the regeneration of solutizer solution is carried out by steam stripping. The fat solutizer solution containing mercaptans and other weak acids extracted from sour hydrocarbon distillate is subjected to steam stripping in a continuous regeneration to result in a lean solution of reduced content of mercaptans and weak acids, and ready to be recirculated to contact more incoming sour gasoline.

Even though it may be possible theoretically to use a solutizer solution indefinitely by continually regenerating it by steam stripping, this method results in certain difficulties. Experience has shown that despite carefully conducted steam stripping, it is not possible to remove all the undesirable substances which may accumulate in the solution during the treatment.

Solutions used a long time tend to form relatively stable emulsions with the hydrocarbon oil under treatment and to foam in the course of steam stripping, due probably to the gradual accumulation of emulsifiers and foaming agents. The emulsions formed, being relatively stable, either reduce the throughput due to retarded settling, or cause the carry-over of valuable solutizer solution. The foaming likewise reduces throughput in the solutizer stripper, and in addition often causes the loss of valuable solutizer with the stripped mercaptans taken overhead.

The exact source and chemical composition of the substances which stabilize the emulsions and cause the foaming are not known. They both appear to be gummy materials of a resinous nature. Possible sources of them include cracked gasoline feeds containing dissolved gums, oxidation of small amounts of cracked gasoline dissolved in the solution and oxidation of portions of solutizer solution, such as alkyl phenols which may purposely form part of the solutizer solution or which may accumulate in solutizer solutions when cracked gasoline feeds are treated.

Various expedients have been suggested, some more beneficial than others, to serve as an aid to and, in addition to steam stripping, to obviate the emulsification and foaming difficulties. They include changing the composition of the solutizer solution so as to decrease its tendency to emulsify when contacted with gasoline, for example, by adding thereto various demulsifiers, and means and agents for cleansing or reconditioning the solution at various intervals.

The first class of expedients mentioned above, namely, addition agents, have not always proved satisfactory. In some cases, though they may be effective in the beginning, their effect is short-lived, and they must be added in ever-increasing quantity, until finally such procedure becomes impracticable.

Means and agents for cleansing a contaminated solution include, among others, solid adsorbents and solutions, to adsorb or precipitate the emulsifying material. The main difficulty with conventional methods of treatment with adsorbents in the case of solutizer solution was that only solutions which were relatively slightly contaminated could be cleansed effectively, and therefore, where the rate of contamination was high the improvement to be gained was soon dissipated when the treatment was resumed. In addition, this type of treatment has met with certain difficulties, for example, in separating the last traces of the adsorbent which, if left in the solution, tend to stabilize the emulsions, thus negativing at least a portion of the benefits of the treatment.

The object of this invention is to decrease emulsion and foaming difficulties in solutizer plants. A more particular purpose is to provide a process for reconditioning used solutizer solutions, particularly those containing accumulated gums, resinous emulsifiers, and foaming agents. Another purpose is to facilitate the treatment of hydrocarbon distillate by means of solutizer solution. Still another purpose is to decrease the cost of operation in solutizer plants by minimizing or preventing losses of valuable solutizer which are suffered when contaminated solutions must be discarded.

Our invention is based on the discovery that a used aqueous solutizer solution, contaminated with accumulated gums, resinous emulsifiers and foaming promoting substances, may be reconditioned by subjecting it to a treatment with certain solid adsorbents at elevated temperatures, thus making it possible to produce a treated solution which has substantially the same composition and the same properties as the original solutizer solution, said treated solution being again suitable for use in the solutizer process for the extraction of mercaptans.

In carrying out our invention, a contaminated aqueous solutizer solution containing accumulated emulsifiers and/or foam inducers is contacted with a finely divided solid adsorbent such as activated carbon, inorganic flocculent solids, etc., at a temperature of at least 50° C. and preferably close to or at the boiling point of the solution. The adsorbent is then separated, and the resulting clean solutizer solution is ready to be re-used.

The time of contact has some bearing on the efficiency of the treatment. In general, the contact should at least be about 10 minutes; longer time of contact does no harm.

In the course of the contact, emulsifiers, and particularly foaming agents, are adsorbed and carried away by the adsorbent. While it is already known that certain flocculent solids and other adsorbents are capable of thus removing harmful impurities from solutizer solutions, it has been discovered that the efficiency of this removal can be greatly improved by carrying out the contact at elevated temperatures as indicated above.

It is of course well known that organic impurities from oleaginous liquids such as hydrocarbon oils are frequently removed by contact with adsorbents more efficiently at elevated temperatures than at lower temperatures. However, in the presence of water or aqueous caustic alkali it is known that a reversal in the adsorption of these organic impurities takes place at elevated temperatures, which may be so complete as to enable full regeneration of a spent adsorbent by treatment with water or aqueous alkali at an elevated temperature (see U. S. Patents 2,162,202 and 1,763,167).

Contrary to this, treatment of contaminated solutizer solutions with a solid adsorbent at elevated temperatures improves the removal of the organic foam and emulsion-forming impurities, even though the solutizer solutions are strongly alkaline aqueous solutions.

In order to facilitate adsorption, the contaminated solutizer solution is usually first diluted with water, preferably distilled water. Solutizer solutions, after having been steam stripped normally, are at least 2N. with respect to alkali metal hydroxide. At the time the solution is contacted with the solid adsorbent, it should contain alkali metal hydroxide in a concentration preferably not greater than 3N. Thus, when starting out with a solutizer solution which contains alkali metal hydroxide in concentration of about 6N as is most usually used, it is desirable to carry out any adsorption in a dilution of at least 1:1 distilled water to solutizer solution.

Suitable amounts of adsorbents may vary between wide limits, depending on the degree of contamination as well as the degree of purification required. Amounts up to about 20% by weight of the original solutizer solution may be used. With activated carbon, the amount of solid adsorbent normally varies between about .5 and 5% and more often between 1 and 3% by weight of the original solutizer solution. When using flocculent solids, this amount will normally be greater, i. e. between about 4 and 15% and preferably 5 to 10% by weight of the original solution. In general, the greater the dilution, the smaller will be the amount of adsorbent needed.

As already indicated, there are two types of solid adsorbents which are suitable for use in our process, namely, flocculent solids and activated carbon. Suitable floccular solids are less than 1% soluble in pure water at normal room temperature, are substantially inert under the conditions of the treatment, and are insoluble in relatively concentrated alkali metal hydroxide. Particularly suitable are floccular oxides or hydroxides of Mg, Ca, Cd, Cu, Cr, Fe, Ni, the carbonates or phosphates of the alkali earth metals and lead, and the sulfates of Ca, Ba, and Pb when in floccular form. The activated carbon should be a good commercial grade, finely divided.

The effect of each type of adsorbent in the removal of undesirable substances is slightly different. Flocs generally remove emulsifiers preferentially and foaming agents to some extent, while activated carbon is extraordinarily effective in removing foaming agents but normally removes a somewhat smaller portion of the emulsifiers. A cleansed solutizer solution treated with activated carbon is often less susceptible to foaming than an original fresh solution of the same composition.

The solution and the adsorbent should be intimately contacted so as to cause the entrainment of the resinous emulsifier with the adsorbent thereby enabling the separation of the adsorbed troublesome materials from the cleansed solutizer solution. The contacting may be continuous or batchwise, and may be resorted to whenever the contaminants have built up to proportions which under the particular treating conditions in the plant may cause difficulties. Carbon is best added in finely divided form to the solution after its dilution. Flocs are usually added in the form of a slurry after dilution, but dilution and addition of the flocs may be simultaneously carried on, as where water treater sludges are employed.

Some flocculent oxides such as magnesium oxide have a tendency to slake at high temperatures, and therefore they show their optimum activity, not at the highest temperatures that normally can be reached with a solution, but instead at moderately elevated temperatures, e. g. between about 50 to 70° C.

After cooling, conventional methods of separation such as settling, decanting, filtering, etc. are generally applicable. However, when using activated carbon, the last traces are often difficult to remove. Its presence even in minute quantities stabilizes emulsions and foams when treatment with the cleansed solution is resumed, and therefore complete removal is important. In order to effect this, we find it convenient to contact the solution with light hydrocarbon oil such as gasoline, kerosene or the like. The gasoline, behaving as a flotation agent, clears the solution of any remaining carbon, causing it to leave the solution and float at the interface, from whence it is easily withdrawn. To avoid the danger of emulsification in the flotation of retained carbon, relatively large quantities of hydrocarbon oil are desirable. Thus suitable amounts may vary, for example between 50% and 200% by volume of the solution.

After completed treatment, it is usually necessary to reconcentrate the solutizer solution to the original concentration, by boiling off water of dilution.

The following explanation and examples illustrate the effectiveness of our treatment:

When solutizer solution and gasoline are passed in countercurrent flow through an extraction tower in which the aqueous phase is continuous, an emulsion of the oil in water type is formed and collects at the top of the solutizer solution. A similar type of emulsion can be formed by stirring solutizer solution and gasoline together, and a stirrer test was accordingly devised whereby small amounts of solutizer solution and gasoline could be caused to form an emulsion under controlled conditions, and the time of settling measured.

Likewise, in the course of stripping mercaptans from the solutizer solution, oftentimes troublesome foaming is encountered. A conventional and reproducible method of measuring the relative foaming tendency of different solutions has therefore been developed. In this foaming test, a small volume of diluted solution is heated in a standard 32 x 300 mm. test tube under controlled conditions, using two carborundum boiling chips. The maximum height of foam developed in the tube is measured in each case. Experience has shown that the foam heights correspond to the following foaming tendencies of the solution: 5-7 inches—very good; 7-8 inches—good; 8-9 inches—fair; above 9 inches—bad.

*Example I*

A full range cracked gasoline was stirred vigorously with a contaminated aqueous solutizer solution containing potassium hydroxide 6N, potassium isobutyrate 1.6N, and potassium phenolate 0.7N under standard conditions. The settling time (time necessary for separation of the two phases) was 19 minutes. Another portion of the same contaminated solutizer solution was contacted with a water softener sludge slurry, the active solid constituents of which were about 8% volume (based on original solutizer). The mixture was heated to boiling temperature for about 15 minutes, after which the solid material was separated by settling and filtering. The filtered solution was then stirred with a full-range cracked gasoline and the settling time was found to have dropped to 10¼ minutes.

The same solutizer solution described above was also subjected to the Tube Foaming Test, and gave the following results:

|  | Foam height, inches |
|---|---|
| Untreated used solution | 10¼ |
| Treated used solution | 8¼ |

*Example II*

Another contaminated solutizer solution was contacted at boiling temperature for about 15 minutes with a water softener sludge slurry, the active solid constituents of which were about 8% volume (based on original solutizer solution). The solid material was separated by filtering and the solution was reconcentrated to its original concentration. The reconditioned solution was then subjected to the Tube Foaming Test to give the following results:

|  | Foam height, inches |
|---|---|
| Untreated used solution | 10¼ |
| Treated used solution | 6¾ |

*Example III*

A contaminated solutizer was diluted with an equal volume of water and contacted at boiling temperature for about 15 minutes with 2.5% by weight (on basis of the original solution) of a fine activated carbon. After cooling, most of the carbon was separated by centrifuging, and the remainder was separated by flotation using gasoline as a flotation agent. After the above treatment the solution was reconcentrated to its original concentration. In the described foaming test, the original solution had a marked foaming tendency, having 9¾ inches foam height. This was improved by the treatment to the point where its foaming tendency was less than that of an unused solution. (See below.)

|  | Foam height, inches |
|---|---|
| Fresh unused solution | 7⅜ |
| Untreated used solution | 9¾ |
| Treated used solution | 6¾ |

We claim as our invention:

1. In a process for reconditioning a contaminated aqueous alkali metal hydroxide solution containing a solutizer for weak organic acids and also containing contaminants comprising resinous emulsifiers and foaming agents accumulated in the course of repeatedly extracting with said solution weak acids from sour hydrocarbon distillates, and regenerating the resulting spent solution by steam stripping, the steps comprising contacting said aqueous solution at an elevated temperature above 50° C. with a small amount of activated carbon to entrain contaminants, and separating said activated carbon containing entrained contaminants from said solution the latter having retained said solutizer.

2. The process of claim 1, wherein the amount of activated carbon is from .5 to 5% by weight of the aqueous solution.

3. In a process for reconditioning a contaminated aqueous alkali metal hydroxide solution containing contaminants comprising resinous emulsifiers and foaming agents accumulated in the course of repeatedly extracting with said solution weak acids from sour hydrocarbon distillates, and regenerating the resulting spent solution by steam stripping, the steps comprising contacting said aqueous solution at an elevated temperature above 50° C. with a small amount of activated carbon, separating entrained activated carbon to produce a cleansed solution containing a smaller residual amount of carbon, contacting said cleansed solution with a light hydrocarbon oil, allowing the resulting mixture to form two liquid layers, whereby said residual carbon accumulates at the interface of said layers and separating the aqueous solution layer from the activated carbon and hydrocarbon layer.

4. The process of claim 3, wherein the amount of light hydrocarbon oil is between 50 and 200% by volume of the aqueous solution.

5. In a process for reconditioning a contaminated aqueous alkali metal hydroxide solution containing a solutizer for weak organic acids and also containing contaminants comprising resinous emulsifiers and foaming agents accumulated in the course of repeatedly extracting with said solution weak acids from sour hydrocarbon distillates and regenerating the resulting spent solution by steam stripping, the steps comprising contacting said aqueous solution at an elevated temperature above 50° C. with a small amount of activated carbon, separating entrained activated carbon to produce the cleansed solution containing a small residual amount of carbon, contacting the cleansed solution with a light hydrocarbon oil, allowing the resulting mixture to form two liquid layers whereby said residual carbon is accumulated at the interphase of said layers, and separating the aqueous solution layer from the activated carbon and hydrocarbon layer, said aqueous solution layer having retained said solutizer.

ALAN C. NIXON.
ORRIS L. DAVIS.